United States Patent
Kim et al.

(10) Patent No.: US 7,027,644 B1
(45) Date of Patent: *Apr. 11, 2006

(54) MULTILEVEL IMAGE GRID DATA STRUCTURE AND IMAGE SEARCH METHOD USING THE SAME

(75) Inventors: Hyeon Jun Kim, Sungnam (KR); Sung Bae Jun, Seoul (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/494,761

(22) Filed: Jan. 31, 2000

Related U.S. Application Data (63) Continuation-in-part of application No. 09/479,888, filed on Jan. 10, 2000, now Pat. No. 6,721,447.

(30) Foreign Application Priority Data

Feb. 1, 1999 (KR) .................................. 1999-3184

(51) Int. Cl.
*G06K 9/00* (2006.01)
(52) U.S. Cl. ..................................... 382/165; 382/305
(58) Field of Classification Search ........ 382/162–166, 382/305–306, 209, 224, 154, 240, 173, 217–220, 382/225, 180; 707/104.1, 1–6; 345/700, 345/835, 589, 597–599, 723, 501; 358/403; 428/141

See application file for complete search history.

(56) References Cited

U.S. PATENT DOCUMENTS

| | | | |
|---|---|---|---|
| 4,728,558 A | | 3/1988 | Ono et al. .................. 428/141 |
| 5,579,471 A * | | 11/1996 | Barber et al. ............... 345/700 |
| 5,608,862 A | | 3/1997 | Enokida ..................... 345/501 |
| 5,724,451 A * | | 3/1998 | Shin et al. .................. 382/240 |
| 6,084,978 A * | | 7/2000 | Taylor et al. ............... 382/154 |
| 6,292,577 B1* | | 9/2001 | Takahashi ................... 382/128 |
| 6,373,979 B1* | | 4/2002 | Wang ......................... 382/165 |
| 6,411,953 B1* | | 6/2002 | Ganapathy et al. ........... 707/6 |
| 6,477,269 B1* | | 11/2002 | Brechner .................... 382/165 |

(Continued)

FOREIGN PATENT DOCUMENTS

JP 10-124528 5/1998

(Continued)

OTHER PUBLICATIONS

Chua et al., Fast signature based color-spatial image retrieval, Jun. 1997, IEEE 0-8186-7819, 362-369.*

(Continued)

*Primary Examiner*—Joseph Mancuso
*Assistant Examiner*—Ishrat Sherali
(74) *Attorney, Agent, or Firm*—Fleshner & Kim LLP

(57) ABSTRACT

The present invention relates to an image search method capable of expressing one color feature related to a spatial color feature of a still image based on a multilevel image grid and similarity-based searching images using the thusly expressed multilevel image grid. In the present invention, hierarchical grids of different levels are generated with respect to one feature for thereby obtaining a data structure in which each cell corresponding to the grid is expressed based on a reliability on a region representative color and the region representative color, so that it is possible to fast and accurately search images with respect to a user's content-based query based on a cell matching of the same level as two image grids and different levels or a color local matching of the grid match.

10 Claims, 5 Drawing Sheets

U.S. PATENT DOCUMENTS 6,721,447 B1 * 4/2004 Kim et al. .................. 382/162
6,778,697 B1 * 8/2004 Shin et al. .................. 382/164

FOREIGN PATENT DOCUMENTS

JP        2000-285141        10/2000

OTHER PUBLICATIONS

Tan, An evaluation of color-spatial retrieval techniques, Sep. 1997, IEEE 0-7803-3676-3, 1078-1082.*

Vellaika et al., Joint Spatial-spectral indexing of image retrieval, IEEE 0-7803-3258, 867-870.*

Chua et al., Fast signature-based color spatial image retrieval, IEEE 0-8186-7819-4/97, 362-369.*

Ardizzoni et al., Windssurf: region based image retrieval using wavelet, IEEE Inspec Accession No. 6359062, 1-7.*

Hans-Georg Stark "On Image Retrieval With Wavelets" Intl. Journal of Imaging Systems and Technology, Wiley and Sons, NY, vol. 7, No. 3 (Sep. 21, 1996) pp. 200-210.

Jacobs et al. "Fast Multiresolution Image Querying" Computer Graphics Proceedings, Annual Conference Series, IEEE (Aug. 6, 1995) pp. 277-286.

Yihong et al. "An Image Database System With Fast Image Indexing Capability Based on Color Histograms" Proceedings of Region 10 Annual Intl. Conference (TENCON); vol. 1; pp. 407-411 (Aug. 8, 1994).

* cited by examiner

MULTILEVEL IMAGE GRID DATA STRUCTURE AND IMAGE SEARCH METHOD USING THE SAME

CROSS-REFERENCE TO RELATED APPLICATIONS

This application is a continuation-in-part of U.S. application Ser. No. 09/479,888 filed Jan. 10, 2000, now U.S. Pat. No. 6,721,447, issued on Apr. 13, 2004. The contents of this patent is incorporated herein by reference.

BACKGROUND OF THE INVENTION

1. Field of the Invention

The present invention relates to an image grid data structure and an image search method using the same, and in particular to a multilevel image grid data structure having a structure of different hierarchical grid levels with respect to one color feature related to a spatial color property of a still image and an image search method for searching an image using a multilevel image grid data structure.

2. Description of the Background Art

In a conventional image search method, a feature such as a color, shape, texture, etc. is expressed in an image grid data structure of one level, and a similarity between different image data of the same structure is searched using an image grid data of one level for thereby searching the image.

When searching an image in accordance with a conventional image search method, the importance of each feature is different in accordance with the characteristics of an image which will be searched. In addition, even with respect to only one feature, the importance is different for each cell in the conventional image grid data structure. For example, in the image search method using a color histogram, which is formed in a n-dimensional structure, a weight value reflecting the importance of each element can be determined as a different value for each element forming the n-dimensional structure.

Namely, in the conventional image search method using an image data stucture of one level, the importance between features is expressed based on the corresponding grid. In this case, however, the importance for each element of a certain feature is not considered. In order to resolve this problem, another conventional image search method adopts a method for computing an average importance of the elements in a certain feature.

However, in the above-described conventional image search method, the average importance for elements of a certain features is not useful, i.e., a pre-determination of an average value for elements of a certain features is not useful in image search since the importance of each element varies by a reference image or target images.

In addition, since the conventional image grid data structure is formed of only one level, the destination contained in an image (or target image) is not accurately searched in the conventional image search method.

SUMMARY OF THE INVENTION

Accordingly, it is an object of the present invention to provide a multilevel image data structure in which each level is expressed by the cells of a hierarchical structure of different levels by expressing one feature based on a multilevel image grid, and expressing a region representative color of each cell and a reliability with respect to the region representative color.

It is another object of the present invention to provide an image search method capable of matching between cells of the same level of two image grids, different levels of grids, and color regions to perform a color similarity retrieval with respect to multilevel image grids corresponding to different images.

To achieve the above objects, there is provided a multilevel image data structure according to the present invention in which a spatial color feature of one image is expressed in a hierarchical image grid structure having more than two different levels.

To achieve the above objects, there is provided an image search method using a multilevel image data structure according to the present invention in which the color similarities of a spatial color feature of a reference image divided into different hierarchical image grid levels and a target image are matched, so that an image is searched in accordance with user's content-based query.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A and 5B are views illustrating an embodiment of an image search method using a multilevel image grid data structure according to the present invention, of which

DETAILED DESCRIPTION OF THE PREFERRED EMBODIMENTS

The present invention relates to a multilevel image grid data structure and an image search method using the same. The method for generating a multilevel image grid data structure according to the present invention will be explained.

In the case of square image, it is uniformly divided by height and width, and in the case of a non-square image, one side is uniformly divided in accordance with an aspect ratio of a width and height of an image, and the other side is uniformly divided by the unit of one side. Namely, a regular square structure having the same length of horizontal and vertical sides is divided by the same unit, and in the case of a rectangular structure having different lengths of horizontal and vertical sides, one side (for example, a lengthy side) is uniformly divided, and the other side (for example, a shorter side) is divided by the dividing unit of one side.

Therefore similarly as above, in one image data structure, the spatial color feature is divided into hierarchical grids of different levels for thereby expressing a structure of a multilevel image grid.

At this time, each image grid is a hierarchical structure of different levels, and the resolution of each level is hierarchically divided. The cell of each grid is assigned with two values which are a regional representative color (RRC) and a reliability score (S) relating to an accuracy of the regional representative color.

Figure 1:
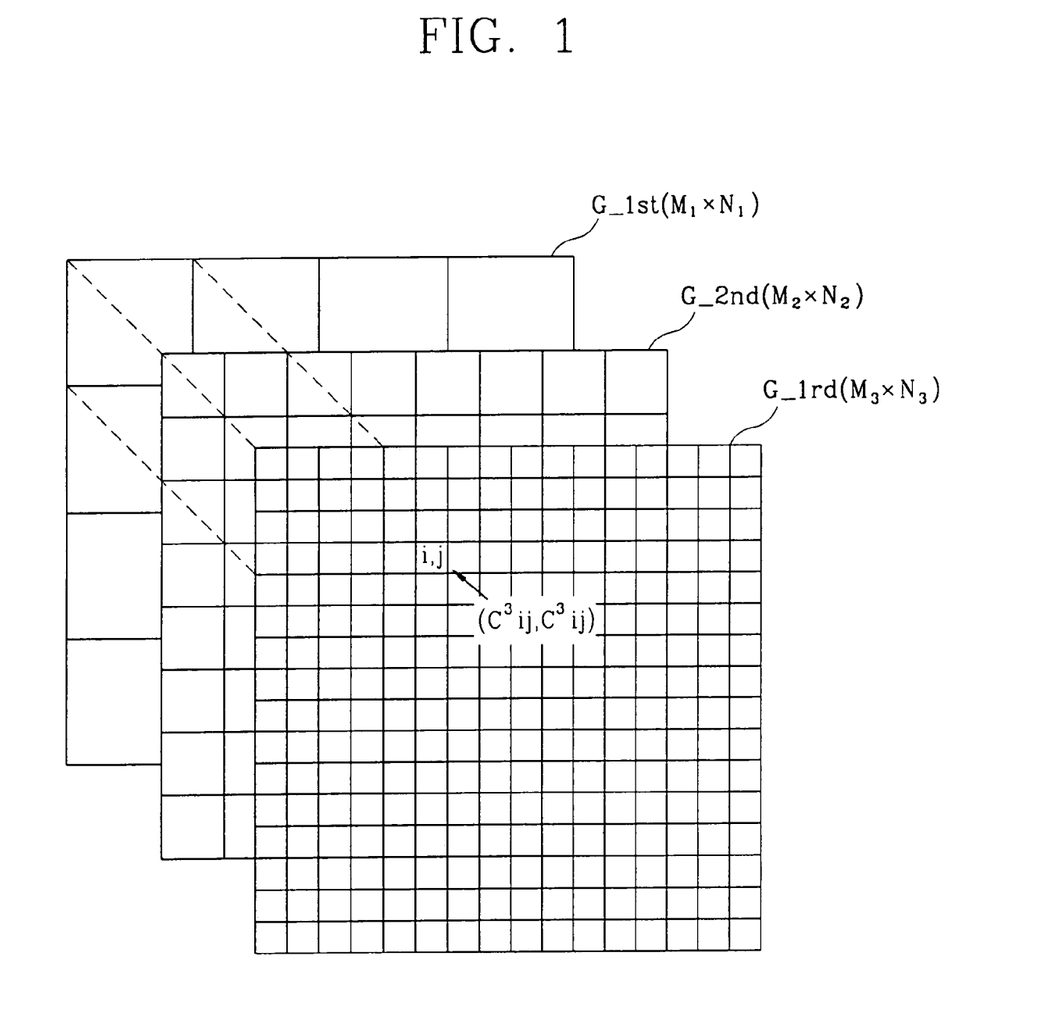
FIG. 1 is a view illustrating an embodiment of a multilevel image grid data structure and a 3-level image grid data structure according to the present invention.

FIG. 1 illustrates an embodiment of a multilevel image grid data structure and a 3-level image grid data structure according to the present invention. Namely, one image is expressed in an image grid level of a first level, second level, and third level.

In the resolution of the 3-level image grid data structure, the first level image grid is the lowest, the second level image grid is an intermediate level, and the third level image grid is higher than the second level image grid in accordance with the divided levels.

The first level image grid is divided into the image region including a M1×N1 number of local cells in proportion to the aspect ratio of a vertical side M and a horizontal side N. Each cell is expressed as a region representative color(RRC) which represents each region, and a reliability score(S) which corresponds to the accuracy of the representative color value.

In addition, the second level image grid and the third level image grid are divided into the image regions including a M2×N2 number and M3×N3 number of local cells in accordance with the dividing state, and each cell has a region representative color(RRC) and a reliability score(S).

For example, when the maximum vertical length M of the first level image grid and the horizontal length N are 8(=8×8), the maximum vertical length M2 of the second level image grid and the horizontal length N2 are 16(=16×16), and the maximum horizontal length M3 of the third level image grid and the vertical length N3 are 32(=32×32) of the local cells.

Here, a certain cell Cell(i,j) of the third level image grid is expressed as a region representative color and a reliability score $C^3_{ij}$, $S^3_{ij}$.

At this time, the number of divisions of each of the image levels of 1st level, second level and third level is determined based on an aspect ratio of the image for accurately expressing the position of the object included in the image. Namely, in the case of the lengthy side, the lengthy side is uniformly divided, and the short side is divided by the divided unit of the lengthy side.

In another method for generating the grid of the image, to increase processing speed and to consider approximate positional information of the object included in the image, the vertical and horizontal lengths may set identically.

The image search method using the multilevel image grid data structure will be explained.

Different images divided into the multilevel image grids are expressed as a representative region color(RRC) which represents the region and a reliability score which expresses an accuracy of the representative color, and a pair of representative region color and reliability are matched to another one, and a cell similarity is computed in accordance with the content-based query of a user for thereby performing an image search.

The color similarity between two images is computed using the multilevel image grid data structure by comparing the cells included in an image grid of each level and the region color(RRC) representing each cell. Namely, the color similarity between two cells is computed using the color similarities Color_Sim(RRC_C1, RRC_C2) which represent the similarity of a region representative color value between the cell C1 and Cell C2.

The first weight ($\alpha$) is multiplied by the color similarities Color_Sim(RRC_C1, RRC_C2), and a result of the multiplication of the color similarities Color_Sim(RRC_C1, RRC_C2) and the second weight ($\beta$) and the similarity I with respect to a reliability between two cells is summed by the result obtained by multiplying the color similarity and the first weight. The thusly summed value is divided by the first weight and second weight and then is normalized, so that the cell similarity Cell_Sim(C1, C2) of two cells C1, C2 is obtained. The above-described operation may be expressed as follows.

$$\text{Cell\_Sim}(C1, C2) = \frac{(\alpha + \beta \times I) \times \text{Color\_Sim}(PRC\_C1, PRC\_C2)}{(\alpha + \beta)} \quad (1)$$

Here, the similarity I of the reliability(S1, S2) between two cells is obtained based on I=1−|S1-S2|.

Therefore, the cell similarities between two different multilevel image grid are matched with respect to the portions between the same levels of the multilevel image and the different levels, and a feature between the images is compared.

Figure 2:
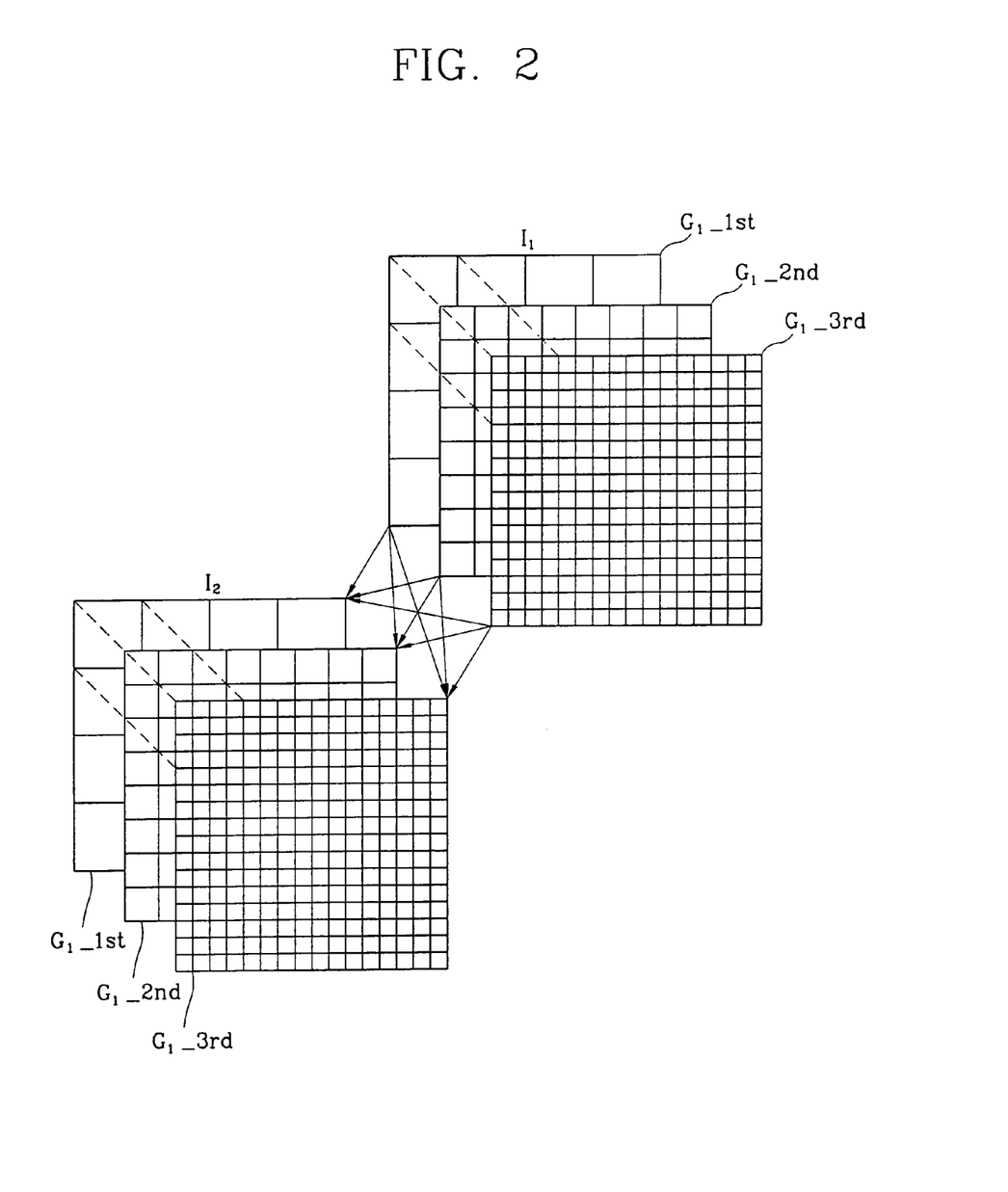
FIG. 2 is a view illustrating an image search method using a multilevel image grid data structure and the construction of a match between 3-level image grid data structures according to the present invention.

FIG. 2 illustrates an embodiment of the image search using a multilevel image grid data structure according to the present invention and a similarity-based search between the grids of two images $I_1$ and $I_2$ having a 3-level image grid data structure.

Two images $I_1$ and $I_2$ include first level image grids $G_1\_^{1st}$, $G_2\_^{1st}$, second level image grids $G_1\_^{2nd}$, $G_2\_^{2nd}$, and third level image grids $G_1\_^{3rd}$, $G_2\_^{3rd}$.

The similarities Grid_Sim($G_1$, $G_2$) between grid levels included in two images are compared between the levels. The above-describe operation may be expressed as follows.

$$\begin{aligned}
\text{Grid\_Sim}(G_1, G_2) = &\ w_1 \times \text{Sim\_of\_the\_Exact}_{G1\_1st\_and\_G2\_1st} + \\
& w_2 \times \text{Sim\_of\_the\_Exact}_{G1\_2nd\_and\_G2\_2nd} + \\
& w_3 \times \text{Sim\_of\_the\_Exact}_{G1\_3rd\_and\_G2\_3rd} + \\
& w_4 \times \text{Sim\_of\_the\_Inter}_{G1\_1st\_and\_G2\_2nd} + \\
& w_5 \times \text{Sim\_of\_the\_Inter}_{G1\_2nd\_and\_G2\_3rd} + \\
& w_6 \times \text{Sim\_of\_the\_Inter}_{G1\_3rd\_and\_G2\_1st} + \\
& w_7 \times \text{Sim\_of\_the\_Inter}_{G1\_1st\_and\_G2\_3rd} + \\
& w_8 \times \text{Sim\_of\_the\_Inter}_{G1\_2nd\_and\_G2\_1st} + \\
& w_9 \times \text{Sim\_of\_the\_Inter}_{G1\_3rd\_and\_G2\_2nd}
\end{aligned} \quad (2)$$

where w1 through w9 represent weights with respect to the respective color similarity, and Sim_of_the_Exact represents a similarity between the same image grid levels with respect to two images $I_1$, $I_2$, and Sim_o- f_the_Inter represents a similarity between different image grid levels with respect to two images $I_1$, $I_2$.

Figure 3:
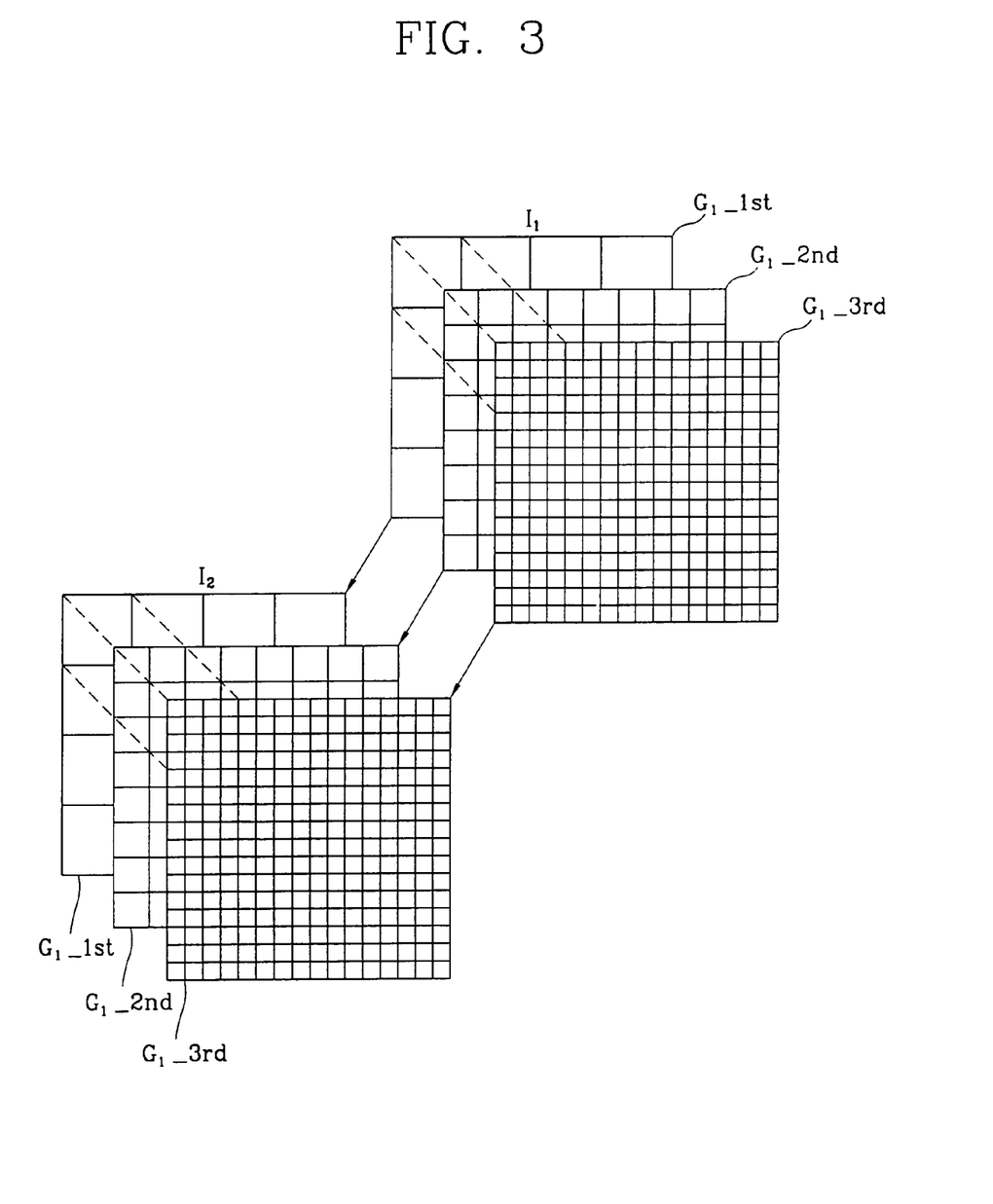
FIG. 3 is a view illustrating an embodiment of an image search method using a multilevel image grid data structure and the construction of a match between the same levels in a 3-level image grid data structure according to the present invention.
Figure 4:
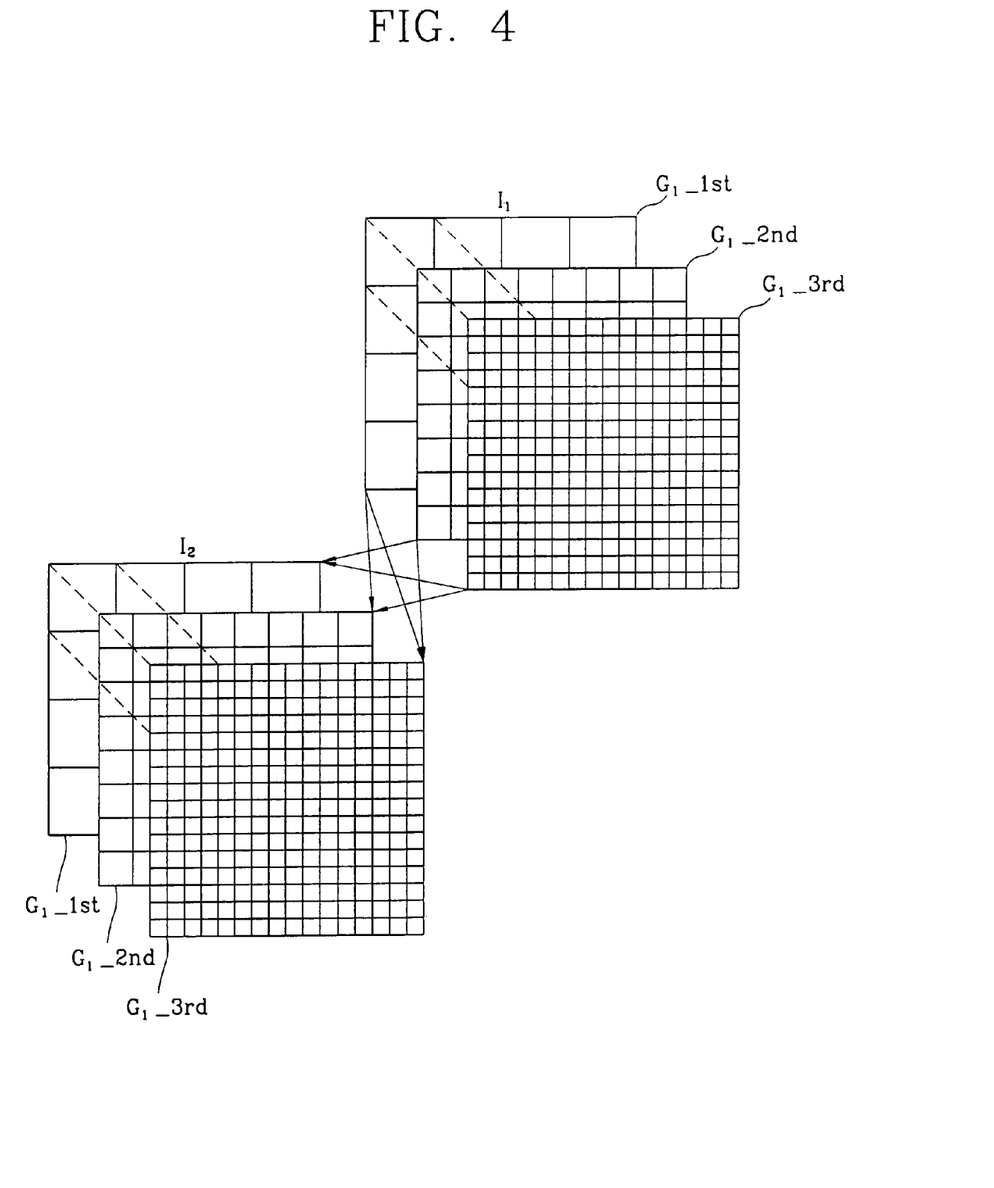
FIG. 4 is a view illustrating an embodiment of an image search method using a multilevel image grid data structure and the construction of a match between different levels of a 3-level image grid data structure according to the present invention.

Namely, the similarity Sim_of_the_Exact between the same image grid levels included in two different images I1 and I2 is obtained based on the match as shown in FIG. 3. In addition, the similarity Sim_of_the_Inter between different image grid levels included in two different images I1 and I2 is obtained based on the match as shown in FIG. 4.

The above-described operation will be explained in more detail with reference to FIGS. 5A and 5B.

The similarities of two cells corresponding to the same levels of two different images are summed, and the similarities of two cells are summed to the thusly summed value by shifting in the horizontal and vertical directions by the aspect ratio.

At this time, the number of the matches of two grids is computed by adding 1 to the absolute value of the difference of the aspect ratio of a certain level of two images.

Figure 5A:
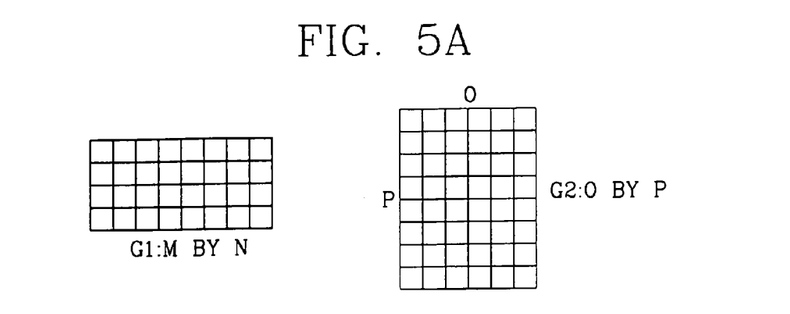
FIG. 5A is a view illustrating two same image grid data structures.
Figure 5B:
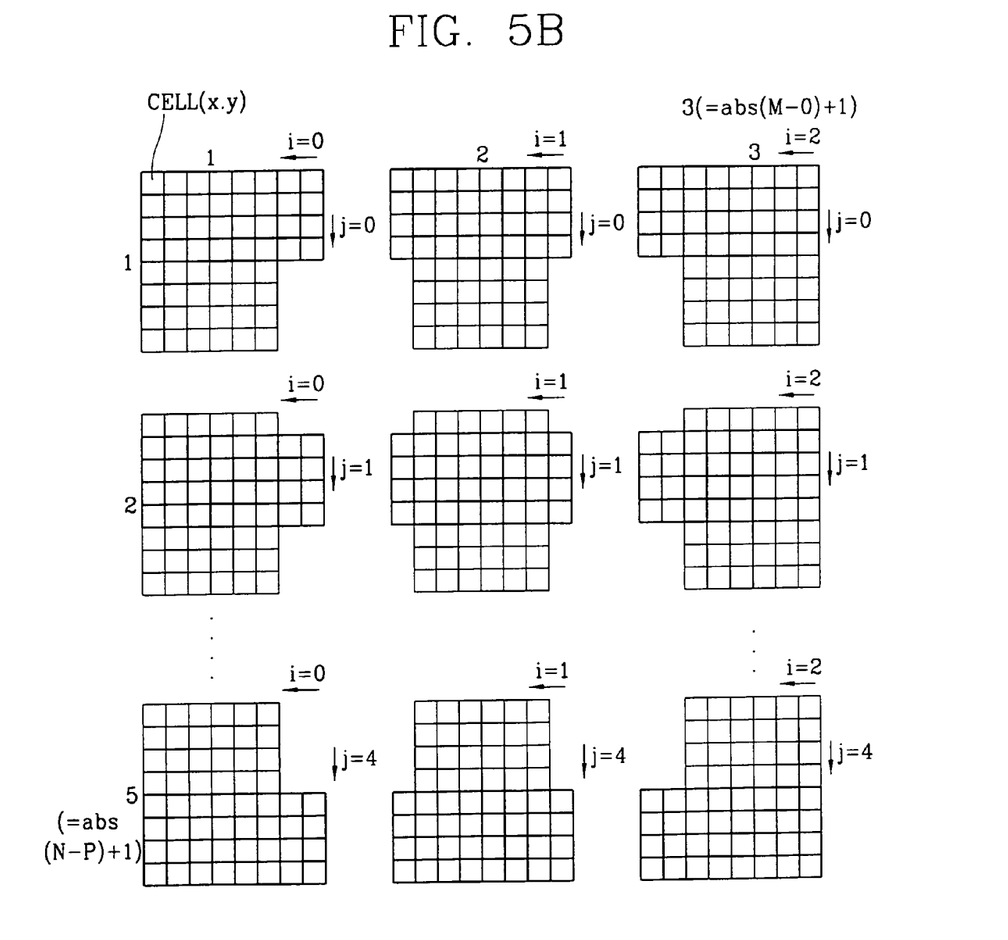
FIG. 5B is a view illustrating a process of a match of two image grid data structures.

For example, as shown in FIG. 5A, assuming that the number of the grids of the aspect ratio of the image $I_1$ is M×N, and the number of the grids of the aspect ratio of the image $I_2$ is O×P, the total number of matches between two grids is (|M−O|+1)×(|N−P|+1).

The similarity between two cells corresponding to the same grid levels Max(M,N)=Max(O,P) is calculated by matching two grids based on different shift amount in accordance with the aspect ratio of two grids.

At this time, the similarity Sim_of_the_Exact based on the match between the same levels of two images I1 and I2 is obtained based on the following Equations 3-1, 3-2.

$$\text{Sim\_of\_the\_Exact} = \quad (3\text{-}1)$$
$$\text{Max}(\text{Sim\_bet\_two\_levels\_given\_cell\_corres } S(i, j))$$
$$\forall i,\ 0 \le i \le |M - O|$$
$$\forall j,\ 0 \le i \le |N - P|$$

$$\text{Sim\_bet\_two\_levels\_given\_cell\_corres } S(i, j) = \quad (3\text{-}2)$$
$$\frac{\sum_{y=0}^{\text{Min}|N-P|-1} \left( \sum_{x=0}^{\text{Min}|M-O|-1} \text{Sim\_of\_corres\_two\_cells}(x, y, i, j) \right)}{\text{Min}(N, P) \times \text{Min}(M, O)}$$

When matching the similarity (Sim_of_the_Exact) between the same levels,
the above-described equation $$\sum_{y=0}^{\text{Min}(|N-P|-1)} \left( \sum_{x=0}^{\text{Min}(|M-O|-1)} \text{Sim\_of\_corres\_two\_cells} \right)$$

represents a sum of the matching with respect to the horizontal and vertical sides of two corresponding cells The similarity Sim_of_corrres_two_cells between two cells is obtained by adapting Equation 404 to Equation 4-1 based on the aspect ratios M:N, O:P.

$$\text{Sim}(\text{cell}^{G1}(x+i,y+j), \text{cell}^{G2}(x,y)) \text{ if } (\text{Min}(N,P)=P) \cap (\text{Min}(M,O)=O) \quad (4\text{-}1)$$

$$\text{Sim}(\text{cell}^{G1}(x+i,y), \text{cell}^{G2}(x,y+j)) \text{ if } (\text{Min}(N,P)=N) \cap (\text{Min}(M,O)=O) \quad (4\text{-}2)$$

$$\text{Sim}(\text{cell}^{G1}(x+i,y+i), \text{cell}^{G2}(x+i,y)) \text{ if } (\text{Min}(N,P)=P) \cap (\text{Min}(M,O)=M) \quad (4\text{-}3)$$

$$\text{Sim}(\text{cell}^{G1}(x,y), \text{cell}^{G2}(x+i,y+j)) \text{ if } (\text{Min}(N,P)=N) \cap (\text{Min}(M,O)=M) \quad (4\text{-}4)$$

Here, Equation 4-1 is applied when P is less than N and M is less than 0 and Equation 4-2 is applied when the length N of the grid $G_1$ is shorter than length P of grid G2 and the width O of the grid G2 is shorter than width M of the grid G1. In addition, Equation 4-3 is applied when the vertical length P of the grid $G_2$ is shorter than N of grid G1 and the horizontal length M of the grid G1 is shorter than 0 of G2, and Equation 44 is applied when N of $G_1$ is shorter than P of $G_2$ and M is shorter than 0.

At this time, the shift amount (i,j) with respect to the length difference (|M−O|,|N−P|) between the length of the grid $G_1$ and the grid $G_2$ is added to the cell coordinate (x, y), and each of start point (i,i,x,y) becomes 0.

The similarity Sim_of_the_Inter between different grid levels(Max(M,N)≠Max(O,P)) is calculated by matching two different image grid levels. This operation is performed similarly as the search of the grid level similarity Sim_of_the_Exact.

In addition, the number of the matches of the image grids between different image grid levels is obtained based on (|M−O|+1)×(|N−P|+1).

The color region matching operation is performed for searching the region in which the representative color values are similar between the multilevel image grids. The search is performed based on a method for searching the color similarity from a translation position and a relative position between the grid level (Exact scale matching) of the same size, and a method for searching the color similarity from a translation position and the relative position between the grid levels (Inter-scale matching) of different sizes.

Namely, the color region matching operation between the image grid levels (Exact scale matching) of the same size is performed based on a method for searching a color region of the same levels from a target image. The position is matched with the relative position based on the same image grid level of the target image, and then the similarity of the color region is computed, and the position is matched with a translation position at the same level of the target image for thereby computing a similarity of the color region.

The color region matching operation between the different image grid levels (Inter-scale matching) is performed based on a method for searching the different level color regions among the target images, and a similarity of the color region of the same level is computed among the different image grid levels of the target image.

In the color region matching method of between different image grid levels, the similarity of the color region is computed by matching the position with the same position among the different image grid levels of the target image, and the similarity of the color region is computed by matching the position with the translation position at another level of the target image.

As described above, in the present invention, one image grid data structure is divided into multilevel grid data structures. Therefore, it is possible to effectively response with respect to a subjective query by a user when searching a content-based image using the divided multilevel grid structures. In addition, an image search speed is fast and accurate under a certain condition.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An image search method, comprising:

determining color similarity between a reference image and a target image each of which is represented by hierarchical grid levels, said determining step including cross-matching grid levels of the reference image and target image, such that a grid on one level of the reference image is matched to a grid of a different level in the target image; and searching images based on a content-based query by a user.

2. The method of claim 1, wherein said determining step includes: matching region representative color values between the grids levels of the reference and target images.

3. The method of claim 1, wherein said determining step further includes: matching the grid levels of the reference image with respective ones of the grid levels of the target image.

4. The method of claim 2, wherein said determining step includes determining similarity of reliability information indicative of accuracies of the region representative color values between the grid levels of the reference and target images.

5. An image search method comprising:

determining color similarity between a reference image and a target image each of which is represented by hierarchical grid levels; and searching images based on a content-based query by a user, wherein the determining step comprises:

determining a similarity between cells in the hierarchical grid levels of the reference and target images in accordance with steps that include:

multiplying color similarity (Color_Sim) corresponding to a similarity of region representative colors between cells in the grid levels of the reference and target images and a first weight, adding a value obtained by multiplying similarity (I) representing a similarity of a reliability between cells in the grid levels of the reference and target images and a second weight to the color similarity (Color_Sim), and normalizing the cell similarity.

6. An image search method comprising:

determining color similarity between a reference image and a target image each of which is represented by hierarchical grid levels; and searching images based on a content-based query by a user, wherein the determining step includes determining a similarity between same grid levels in the reference and target images based on a total value summed by shifting in a horizontal and vertical direction based on a shifting amount by a difference of widths and heights between grid levels when two grid levels are compared and the similarity is calculated.

7. An image search method comprising:

determining color similarity between a reference image and a target image each of which is represented by hierarchical grid levels; and searching images based on a content-based query by a user, wherein the determining step includes determining a color similarity between the grids of the reference and target images based on a value summed shifting in a horizontal direction and a vertical direction by a difference in width and heights between the grid levels.

8. The method of claim 1, wherein a cell similarity between grid levels of the reference and target images is used for searching a same position and different position between same levels in the case that the search is performed by matching a color region.

9. An image search method comprising:

determining color similarity between a reference image and a target image each of which is represented by hierarchical grid levels, said determining step including cross-matching grid levels of the reference image with grid levels of the target image, such that a grid on one level of the reference image is matched to a grid of a different level in the target image; and searching images based on a content-based query by a user, wherein a color region matching operation between the grid levels of the reference and target images is directed to searching at a same position of different levels and at a different position when searching the color similarity between different levels.

10. The method of claim 1, wherein the determining step is performed using a multilevel image data structure which is expressed based on an image grid having at least two different hierarchical levels.

* * * * *